(12) United States Patent
Burnell et al.

(10) Patent No.: US 9,809,319 B2
(45) Date of Patent: Nov. 7, 2017

(54) AIRCRAFT FUEL SYSTEM

(71) Applicant: AIRBUS OPERATIONS LIMITED, Bristol (GB)

(72) Inventors: Stephen Burnell, Bristol (GB); Tim Leigh, Bristol (GB)

(73) Assignee: AIRBUS OPERATIONS LIMITED, Bristol (GB)

( * ) Notice: Subject to any disclaimer, the term of this patent is extended or adjusted under 35 U.S.C. 154(b) by 188 days.

(21) Appl. No.: 14/795,481

(22) Filed: Jul. 9, 2015

(65) Prior Publication Data

US 2016/0009406 A1 Jan. 14, 2016

(30) Foreign Application Priority Data

Jul. 10, 2014 (GB) .................................. 1412311.1

(51) Int. Cl.
| | |
|---|---|
| *B64D 37/32* | (2006.01) |
| *B64D 37/24* | (2006.01) |
| *B64D 37/14* | (2006.01) |
| *B64D 37/10* | (2006.01) |

(52) U.S. Cl.
CPC ............. *B64D 37/32* (2013.01); *B64D 37/10* (2013.01); *B64D 37/14* (2013.01); *B64D 37/24* (2013.01)

(58) Field of Classification Search
CPC ........ B64D 37/08; B64D 37/10; B64D 37/14; B64D 37/20; B64D 37/24; B64D 37/32
See application file for complete search history.

(56) References Cited

U.S. PATENT DOCUMENTS

| | | | |
|---|---|---|---|
| 2,472,622 A | 6/1949 | Savard | |
| 2,870,936 A * | 1/1959 | Clayton | B64D 37/10 220/88.3 |
| 5,323,724 A | 6/1994 | Husain | |
| 6,698,692 B1 | 3/2004 | Tichenor et al. | |
| 2004/0262455 A1 | 12/2004 | Picot et al. | |
| 2009/0314783 A1 * | 12/2009 | Losinski | B64D 37/08 220/530 |
| 2011/0272526 A1 | 11/2011 | Barbosa et al. | |
| 2012/0087807 A1 | 4/2012 | Buchwald | |
| 2012/0279395 A1 | 11/2012 | K-Wlam et al. | |

FOREIGN PATENT DOCUMENTS

| | | |
|---|---|---|
| EP | 2384972 A2 | 11/2011 |
| EP | 2439141 A2 | 4/2012 |
| EP | 2520493 A2 | 11/2012 |
| GB | 2511795 A | 9/2014 |

OTHER PUBLICATIONS

Extended European Search Report issued in EP Application No. 15176100.4 dated Nov. 16, 2015.

* cited by examiner

*Primary Examiner* — Nicholas McFall
(74) *Attorney, Agent, or Firm* — Hauptman Ham, LLP

(57) ABSTRACT

The invention provides an aircraft fuel system comprising a fuel storage facility for storing fuel and ullage, a separate ullage storage facility for storing ullage, and a transfer arrangement for transferring ullage between the fuel storage facility and the ullage storage facility, wherein the transfer arrangement is capable of controlling the transfer of ullage based on a pressure input to the transfer arrangement. The invention also provides an aircraft with such a fuel system and a method of operating an aircraft.

5 Claims, 4 Drawing Sheets

AIRCRAFT FUEL SYSTEM

RELATED APPLICATIONS

The present application claims priority from Great Britain Application Number 1412311.1, filed Jul. 10, 2014, the disclosure of which is hereby incorporated by reference herein in its entirety.

BACKGROUND OF THE INVENTION

The present invention relates to an aircraft fuel system comprising a fuel storage facility for storing fuel and ullage. The present invention also relates to an aircraft with such a fuel system and a method of operating an aircraft.

Aircraft fuel is stored in one or more aircraft tanks. Air that contains fuel vapour, such as the air above the fuel in the fuel tanks, is known as ullage. When an aircraft is refuelled, the pressure in the fuel tanks is high and, in order to prevent a large difference in pressure between the tank and the atmosphere (to prevent damage to the wing), ullage is expelled into the atmosphere. Similarly, upon aircraft ascent, ullage is expelled to the atmosphere. This causes fuel vapour to be emitted, which may be harmful to the environment.

Upon aircraft descent, especially after fuel has been depleted, in order for the pressure in the fuel tanks to be increased to reduce the pressure difference between the fuel tanks and the atmosphere, air is injected back into the fuel tanks.

In addition, the air that has been injected back in is often treated to reduce its oxygen content so as to maintain low levels of oxygen in the aircraft tanks and to reduce the flammability risk of the fuel tanks. The inerting system often is required to produce a large amount of inert (low oxygen level) air upon descent and this results in a weight, drag and power consumption penalty for the aircraft. Also, when air is injected back into the tanks, water is often ingested too. This is because the humid outside air is drawn into the tanks and the water then condenses on the fuel and the cold surfaces within the tank. This leads to regular water drain maintenance being required and may result in fuel system equipment failures due to, for example, water ingress into valves and pressure switches, or switches seizing up or seals malfunctioning due to freezing.

An example of an inerting system is shown in EP 2439141. This discloses an aircraft fuel system where ullage is taken from the fuel tank, using engine bleed air, processed through a main catalytic unit, to reduce its oxygen content, and returned to the fuel tank. The engine bleed air is used to control the speed of ullage flow through the main catalytic unit, based on the temperature in the unit. In other words, the ullage flow is caused to bypass the main catalytic unit and return to the fuel tank (to reduce the amount of reaction occurring) if the main catalytic unit is getting too hot. The inerting system is known as a GOBIGGS (Green On Board Inert Gas Generation System).

The present invention seeks to mitigate the above-mentioned problems. Alternatively or additionally, the present invention seeks to provide an improved aircraft fuel system.

SUMMARY OF THE INVENTION

The present invention provides, according to a first aspect, an aircraft fuel system comprising a fuel storage facility for storing fuel and ullage, a separate ullage storage facility for storing ullage, and a transfer arrangement for transferring ullage between the fuel storage facility and the ullage storage facility, wherein the transfer arrangement is capable of controlling the transfer of ullage based on a pressure input to the transfer arrangement.

Such an arrangement allows ullage to be stored on the aircraft and can be resupplied to the fuel storage facility when required. This reduces the burden on an inerting system, as the ullage replaced back into the fuel storage facility from the ullage storage facility has a lower oxygen content than air that would otherwise have had to be taken from the atmosphere. This gives a weight, drag and power consumption benefit. It also reduces the amount of water ingested into the fuel storage facility, as the ullage replaced back into the fuel storage facility from the ullage storage facility has a lower water content than air that would otherwise have had to be taken from the atmosphere. This reduces the water-related maintenance burden. This could be a large cost saving, as water-related maintenance of a fuel system could be as much as half of the total fuel system maintenance cost. This arrangement also reduces the amount of fuel vapour emitted to the atmosphere.

The transfer arrangement is capable of controlling the transfer of ullage based on a pressure input to the transfer arrangement. This allows the natural pressure changes caused during flight to be used to transfer the ullage between the fuel storage facility and the ullage storage facility.

If an inerting system is used, this could be used on the ullage in the ullage storage facility during flight and before the stored ullage is needed. Hence, the use of the inerting system could be optimised and the weight or size etc. of the inerting system could be reduced.

Preferably, a pressure-controlled valve arrangement of the transfer arrangement is capable of controlling the transfer of ullage based on a pressure input to the valve arrangement. Preferably, the pressure-controlled valve arrangement comprises a number of valves that are opened and closed based on the pressure input.

More preferably, the pressure-controlled valve arrangement is designed to control the transfer of ullage based on a continually changing pressure input.

Preferably, the pressure input is an indication of the pressure in the fuel storage facility. The pressure input may also include an indication of atmospheric pressure.

More preferably, the pressure input is a pressure measured in the fuel storage facility.

Alternatively or additionally, the pressure input is based on an ambient pressure and an amount of fuel usage.

Preferably, the pressure-controlled valve arrangement is designed to transfer ullage from the fuel storage facility to the ullage storage facility when the pressure input is relatively high and to transfer ullage from the ullage storage facility to the fuel storage facility when the pressure input is relatively low.

Preferably, the transfer arrangement is capable of only allowing the transfer of ullage to the ullage storage facility and not to allowing the transfer of fuel to the ullage storage facility. This prevents fuel from transferring from the fuel storage facility to the ullage storage facility. This means the ullage storage facility does not have to be designed to contain fuel.

More preferably, the transfer arrangement comprises a valve, such as a float valve, for allowing transfer of ullage, but not transfer of fuel, from the fuel storage facility to the ullage storage facility.

Preferably, the aircraft fuel system further comprises a pump for effecting transfer of the ullage between the fuel storage facility and the ullage storage facility.

Preferably, the ullage storage facility comprises a variable volume ullage container. For example, the variable volume ullage container may be an expandable bladder.

Preferably, the aircraft fuel system further comprises a compressor for compressing the ullage and wherein the ullage storage facility comprises a pressurisable container for storing the compressed ullage.

More preferably, the ullage storage facility further comprises an intermediate container connected between the pressurisable container and the pressure-controlled valve arrangement. This allows easier ullage transfer from the pressurisable container to the fuel storage facility.

Preferably, the fuel storage facility comprises a surge container for accommodating excess fuel.

Preferably, the aircraft fuel system further comprises a climb-dive valve for ensuring a limited pressure difference between a pressure in the fuel storage facility and an atmospheric pressure.

Preferably, the aircraft fuel system further comprises an inerting system for reducing the oxygen content of the ullage.

More preferably, the inerting system is connected to the ullage storage facility so as to act upon the ullage in the ullage storage facility to reduce its oxygen content.

According to a second aspect of the invention there is also provided an aircraft comprising the aircraft fuel system as described above. The aircraft comprises engines to power the aircraft and wherein the engines are arranged to be fuelled by the aircraft fuel system as described above.

According to a third aspect of the invention, there is provided a method of operating an aircraft, the method comprising the following steps supplying fuel to a fuel storage facility of an aircraft fuel system of the aircraft, transferring at least some ullage from the fuel storage facility, through a transfer arrangement, to a separate ullage storage facility, based on a pressure input to the transfer arrangement, storing at least some of the transferred ullage in the ullage storage facility, and transferring at least some of the stored ullage from the ullage storage facility, through the transfer arrangement, to the fuel storage facility, based on the pressure input to the transfer arrangement.

Preferably, the transfer of ullage between the fuel storage facility and the ullage storage facility is controlled by a pressure-controlled valve arrangement, based on a pressure input to the pressure-controlled valve arrangement.

Preferably, the pressure input is an indication of the pressure in the fuel storage facility.

Preferably, the method comprises the step of flying the aircraft, thereby using up some of the fuel in the fuel storage facility and thereby reducing the pressure in the fuel storage facility, and then transferring at least some of the stored ullage from the ullage storage facility, through the transfer arrangement, to the fuel storage facility, based on the pressure input to the transfer arrangement. This allows the pressure in the fuel storage facility to be maintained at an acceptable level, despite the reduction in pressure due to the fuel usage.

Preferably, the method comprises the step of climbing the aircraft to an increased altitude level, thereby increasing the pressure in the fuel storage facility relative to atmospheric pressure, and, at the increased altitude level, transferring at least some ullage from the fuel storage facility, through the transfer arrangement, to the ullage storage facility, based on a pressure input to the transfer arrangement. The transferring of the ullage is preferably done as a result of the increase in relative pressure of the fuel storage facility. In other words, the pressure input reflects the increase in relative pressure of the fuel storage facility.

Preferably, the method comprises the step of descending the aircraft to a reduced altitude level, thereby decreasing the pressure in the fuel storage facility relative to atmospheric pressure, and, at the reduced altitude level, transferring at least some ullage from the ullage storage facility, through the transfer arrangement, to the fuel storage facility, based on a pressure input to the transfer arrangement. The transferring of the ullage is preferably done as a result of the decrease in relative pressure of the fuel storage facility. In other words, the pressure input reflects the decrease in relative pressure of the fuel storage facility.

More preferably, the method comprises the step of in-taking atmospheric air from outside the aircraft into the fuel storage facility at a first altitude and then allowing transfer of the at least some of the stored ullage from the ullage storage facility, through the transfer arrangement, to the fuel storage facility at a second, lower altitude.

It will of course be appreciated that features described in relation to one aspect of the present invention may be incorporated into other aspects of the present invention. For example, the method of the invention may incorporate any of the features described with reference to the apparatus of the invention and vice versa.

DESCRIPTION OF THE DRAWINGS

Embodiments of the present invention will now be described by way of example only with reference to the accompanying schematic drawings of which.

DETAILED DESCRIPTION

Figure 1A:
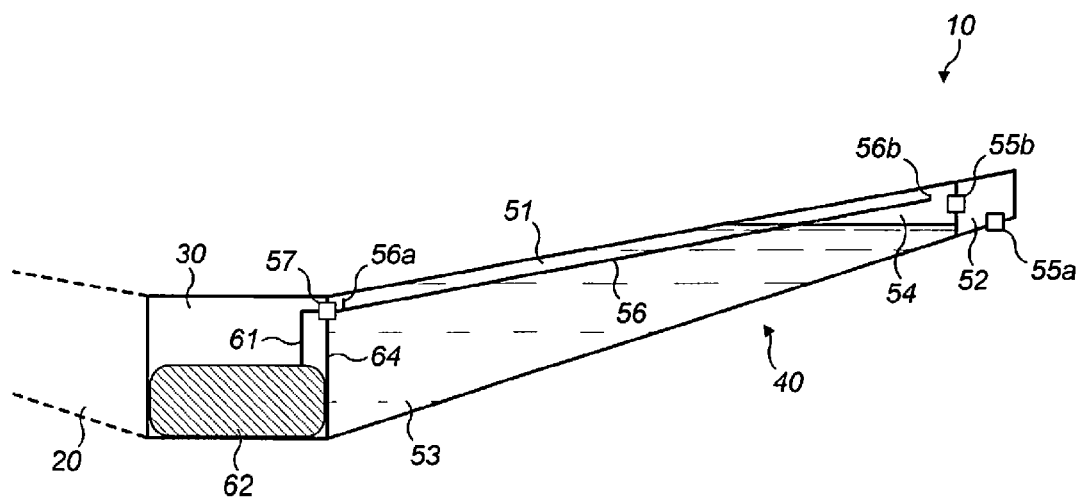
FIG. 1a shows a schematic rear view of part of an aircraft according to a first embodiment of the invention.

FIG. 1a shows a schematic rear view of part of an aircraft 10 according to a first embodiment of the invention. The aircraft 10 comprises a port wing 20, a centre wing box 30, and a starboard wing 40. The tank arrangement of the starboard wing 40 will now be described in more detail.

The starboard wing 40 comprises a fuel tank 51, taking up most of the space in the wing, and a surge/vent tank 52, at an outboard tip of the wing 40. The fuel tank 51 holds fuel 53 and also ullage 54 (the gas above the fuel in the tank). The ullage 54 contains fuel vapour.

A climb-dive valve 55 is located adjacent the surge tank. The Figure shows two possible locations for the valve; a first location at the very tip of the wing, outboard of the surge/vent tank 55a at a NACA duct outlet (not shown) and a second location inboard of the surge/vent tank 55b in the vent system ducting (not shown).

In either position, the climb dive valve 55 is a two-way valve that partially pressurises the fuel tank 51. The climb-dive valve 55 only allows a specified maximum pressure differential across it so that the fuel tank 51 does not experience a pressure very different to atmospheric pressure. This could otherwise cause damage to the wing 40.

In other words, at a specified positive pressure difference (typically +2.9 psi) and higher of the fuel tank 51, the climb-dive valve 55 opens to allow air out of the tank 51. At a specified negative pressure difference (typically −1.9 psi) and lower of the fuel tank 51, the climb-dive valve 55 opens to allow air into the fuel tank 51.

The fuel tank 51 is provided with ducting 56. This ducting has a first inlet/outlet 56a corresponding to the location of ullage in climb 54a and a second inlet/outlet corresponding to the location of ullage in early cruise 54b (see FIG. 1b). Another inlet/outlet of the ducting 56 is connected to a first side of a pressure control valve assembly 57, located in the wall 64 between the starboard wing 40 and the centre box 30.

Inside the centre box 30 a pipe 61 is connected to the second side of the pressure control valve assembly 57. An opposite end of the pipe 61 is connected to an expandable bladder 62 located within the centre box 30.

The pressure control valve assembly 57 is an electronically controlled set of valves. The valves include a float valve (not shown) so that ullage 54 only (and not fuel 53) can pass from the fuel tank 51 to the expandable bladder 62. Alternatively, the float valves may be situated in the ducting 56, for example at the first and second inlet/outlets 56a, 56b.

The valves in the pressure control valve assembly 57 are controlled to allow ullage 54 to flow from the tank 51 to the bladder 62 in some circumstances and to allow ullage 54 to flow from the bladder 62 to the tank 51 in other circumstances. Typically, the valve assembly 57 is controlled to allow/urge ullage 54 to flow into the bladder 62 during refuel, be closed during climb, and allow/urge ullage 54 to flow into the tank 51 during cruise and/or descent. This will be described in more detail in relation to FIGS. 2a to 2e.

The assembly 57 also comprises a pump or compressor (not shown) for urging ullage 54 between the tank 51 and bladder 62 in certain circumstances. The assembly 57 is connected to a pressure sensor (not shown) in the tank 51 and is controlled based on the pressure sensed by that sensor. Alternatively, it could be controlled according to atmospheric pressure and a rate of usage of fuel 53.

The aircraft 10 also has an "OBIGGS" (On Board Inert Gas Generation System) (not shown), which is used to produce oxygen depleted air (ODA). This ODA is injected into the bladder 62, when necessary.

Figure 1B:
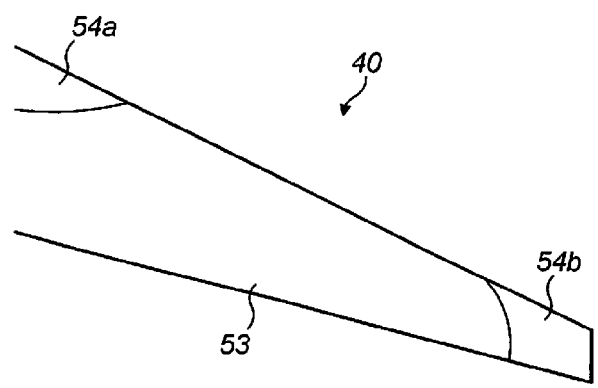
FIG. 1b shows a schematic plan view of part of an aircraft according to the first embodiment of the invention.

FIG. 1b shows a schematic plan view of part of an aircraft 10 according to the first embodiment of the invention. This Figure simply shows where the ullage 54 is located at different times during the aircraft flight cycle. Typically, in climb, the ullage 54a is located at the front inboard root of the wing. Typically, in early cruise, the ullage 54b is located at the outboard tip of the wing. The location of inlet/outlets 56a, 56b of the ducting 56 correspond to these locations 54a, 54b.

FIGS. 2a to 2e show schematic rear views of part of an aircraft 110 according to a second embodiment of the invention. This second embodiment is very similar to the first embodiment. However, the ducting 56 and the surge/vent tank 52 are not shown, for clarity. All other elements are similar to the elements of the first embodiment, and are labelled with the same reference numerals, with the addition of a preceding "1". In this embodiment, the climb-dove valve 155a is located at the first location (55a in the first embodiment) at the very tip of the wing 140, outboard of the surge/vent tank at a NACA duct outlet (not shown).

Figure 2A:
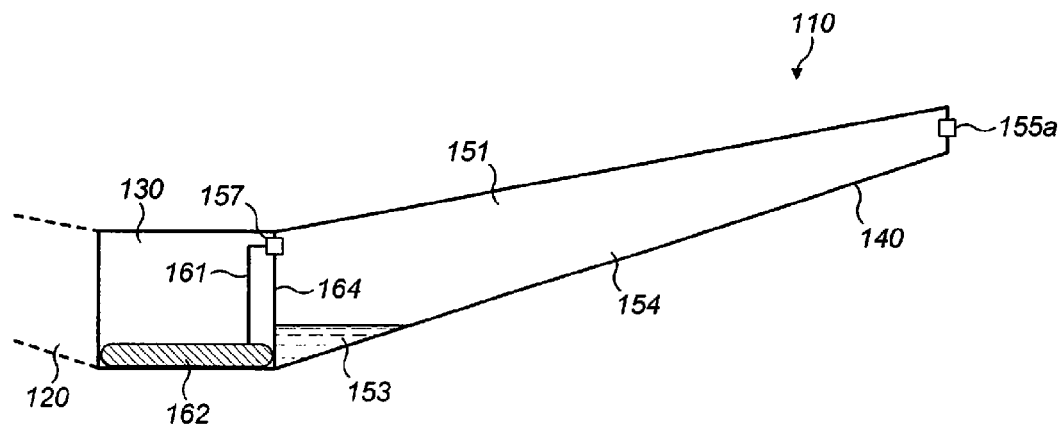
FIG. 2a shows a schematic rear view of part of an aircraft according to a second embodiment of the invention, whilst on the ground prior to refuel.

FIG. 2a shows the aircraft 110 whilst on the ground prior to refuel. Here, the pressure in the fuel tank 151 is slightly lower than atmospheric pressure as the aircraft has recently descended (into higher pressure air) and the climb-dive valve 155a allows a certain negative pressure difference. The tank 151 has little fuel 153 in it (as a lot has recently been used up from the previous flight) and there is a large amount of ullage 154 in the tank 151. There is no stored ullage in the bladder 162.

Figure 2B:
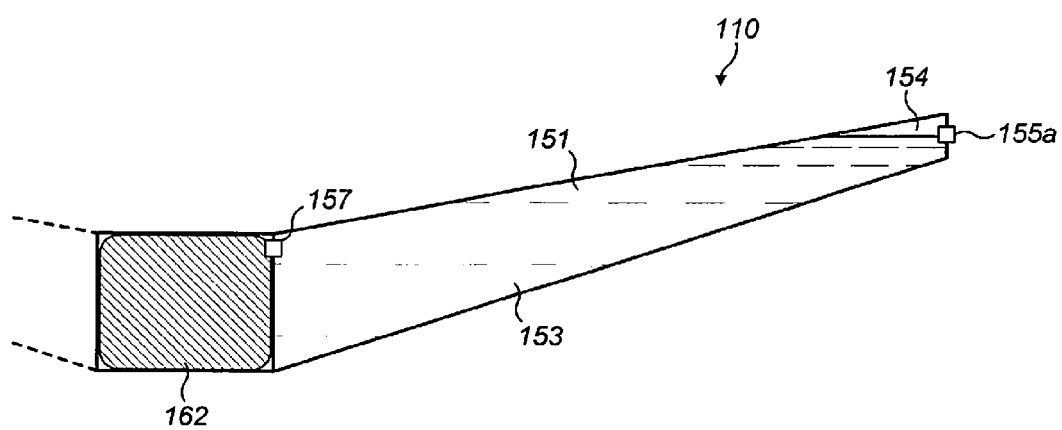
FIG. 2b shows a schematic rear view of part of an aircraft according to the second embodiment of the invention, whilst on the ground after refuel.

FIG. 2b shows the aircraft 110 whilst on the ground after refuel. Here, the fuel tank 51 has been refueled with fuel 153 and now contains very little ullage 154. During refuel, the ullage 154 that was in the tank 151 was allowed through the pressure control valve assembly 157 into the bladder 162. The pressure valve assembly 157 was opened to allow this ullage flow 154 to the bladder 162 in response to an increasing pressure in the tank 151 (sensed by a pressure sensor in the tank 151, connected to the valve assembly 157). Hence, the bladder 162 here is fully expanded to hold the ullage 154. The pressure of the ullage 154 in the tank 151 and also in the bladder 162 is higher than atmospheric pressure because of the refuel process and because the climb-dive valve 155a allows a certain positive pressure difference.

Storing the ullage 154 in the bladder 162 prevents the ullage being ejected out of the aircraft (through the climb-dive valve 155a) into the atmosphere.

Figure 2C:
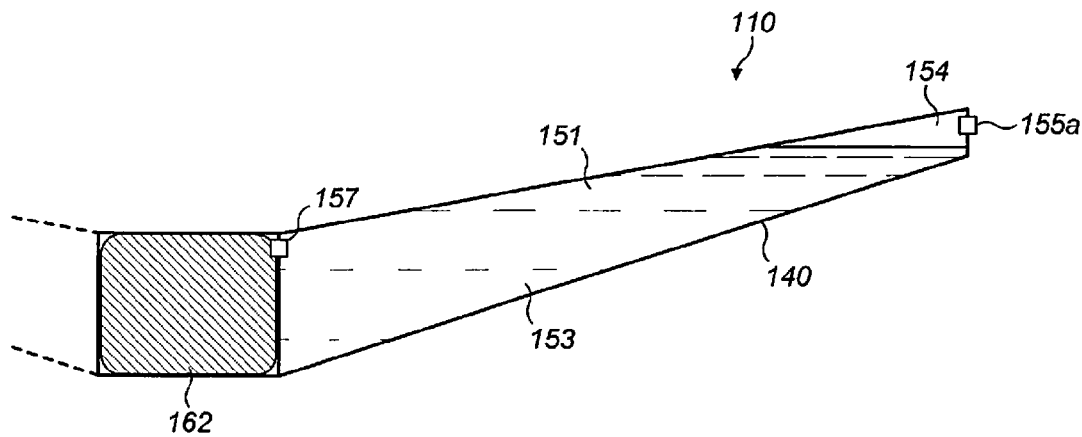
FIG. 2c shows a schematic rear view of part of an aircraft according to the second embodiment of the invention, whilst at the start of cruise.

FIG. 2c shows the aircraft 110 whilst at the start of cruise, after the aircraft has climbed to or near cruising altitude. The atmospheric pressure here is low and the fuel 153 level is still high (as not much has been consumed yet). The climb-dive valve 155a prevents the ullage 154 in the fuel tank 151 from being too high in comparison to the atmospheric pressure so once this maximum positive pressure difference is reached (i.e. once the aircraft has climbed to a low enough atmospheric pressure), some ullage 154 is expelled out of the fuel tank 151 through the climb-dive valve 155a. This ullage 154 must be expelled so that the wing 140 does not experience a large pressure differential with the atmosphere. The ullage 154 cannot be stored in the bladder 162, as the bladder 162 is full.

During flight, the fuel is gradually used up and some of the ullage 154 stored in the bladder 162 is allowed through the pressure control valve assembly 157 into the tank 151 during flight to replace this volume. The pressure valve assembly 157 was opened to allow this ullage flow 154 to the fuel tank 151 in response to a decreasing pressure in the tank 151 (sensed by a pressure sensor in the tank 151, connected to the valve assembly 157).

Figure 2D:
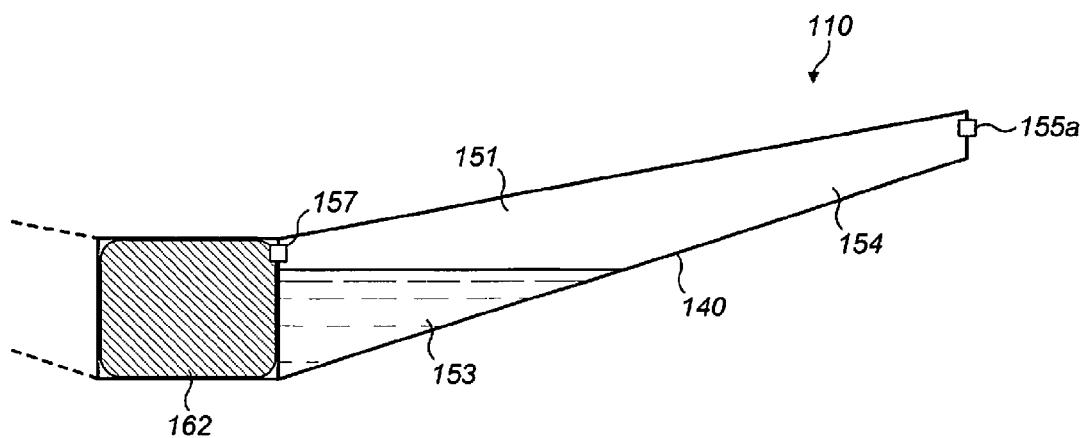
FIG. 2d shows a schematic rear view of part of an aircraft according to the second embodiment of the invention, whilst at the start of descent.

FIG. 2d shows the aircraft 110 whilst at the start of (or just before) descent. Here, a lot of fuel 153 has been used up so there is not much fuel 153 left in the tank 151. It has been replaced by some ullage 154 from the bladder 162 (allowed through the pressure control valve assembly 157, as described above) in order to keep the pressure of the tank 151 at an acceptable level. The ullage 154 in the tank 151 is at low pressure because of the low atmospheric pressure and the climb-dive valve 155*a* maintaining a similar pressure in the tank 151.

During descent, the ullage 154 in the bladder 162 is moved to the tank 151 (allowed through the pressure control valve assembly 157) to increase the pressure of the ullage 154 in the tank 151 in order to keep it within a certain negative pressure difference of the increasing atmospheric pressure. The pressure valve assembly 157 is open to allow this ullage flow 154 to the fuel tank 151 in response to the increasingly negative pressure difference of the fuel tank 151 compared to the atmospheric pressure (sensed by a pressure sensor in the tank 151, connected to the valve assembly 157).

Figure 2E:
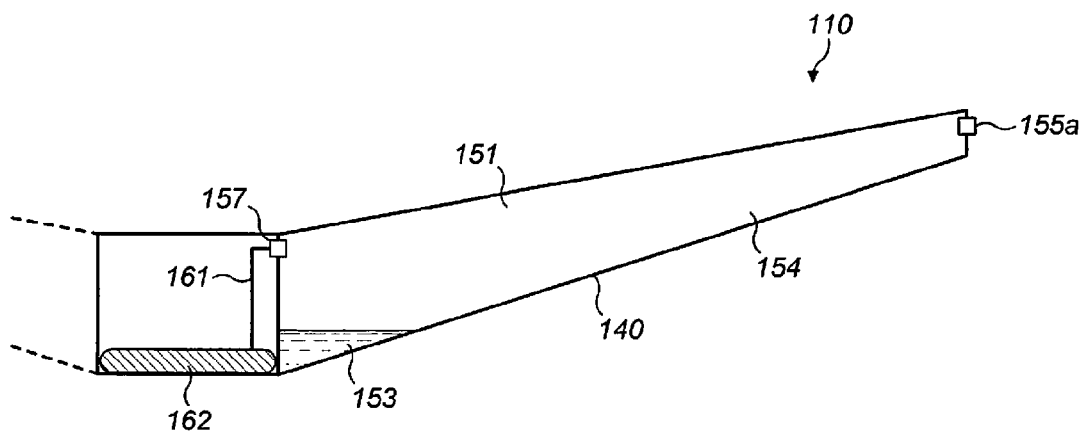
FIG. 2e shows a schematic rear view of part of an aircraft according to the second embodiment of the invention, whilst at the end of decent.

FIG. 2*e* shows the aircraft 110 whilst at the end of decent, after landing on the ground. Here, it can be seen that all the ullage in the bladder 162 has all been moved to the tank 151. In addition, air from the OBIGGS system (oxygen depleted air—ODA) has also been passed from the bladder 162 to the tank 151 (allowed through the pressure control valve assembly 157) to ensure the tank 151 remains inerted and to increase the pressure in the tank 151 sufficiently. The fuel tank 151 is now back to the same state as shown in FIG. 2*a*.

Figure 3:
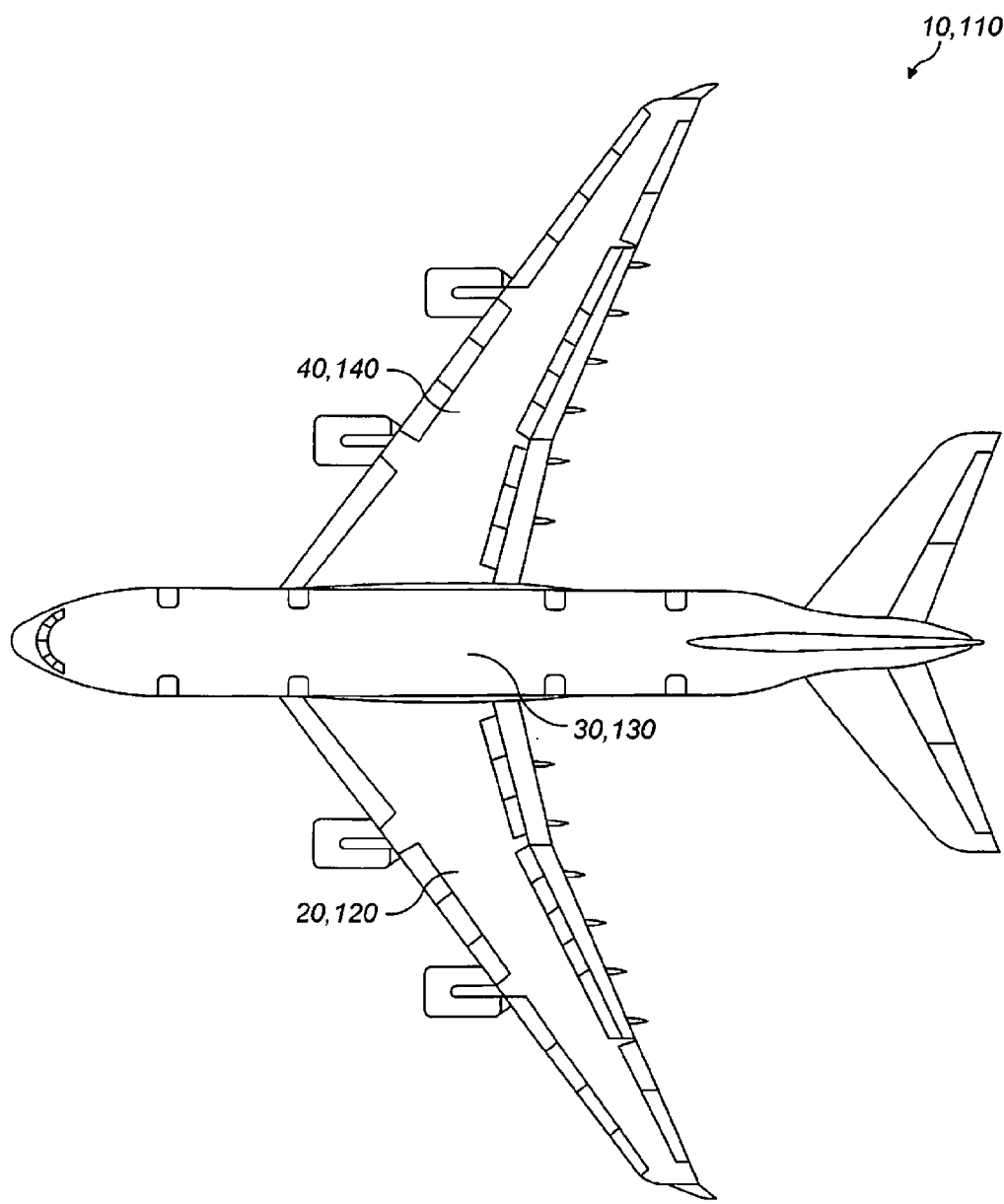
FIG. 3 shows a schematic plan view of an aircraft according to either the first or second embodiment.

The tank arrangement as described in relation to the first and/or second embodiments may be used with an aircraft, such as that shown in FIG. 3.

Whilst the present invention has been described and illustrated with reference to particular embodiments, it will be appreciated by those of ordinary skill in the art that the invention lends itself to many different variations not specifically illustrated herein. By way of example only, certain possible variations will now be described.

A similar arrangement may also, or alternatively, be provided in the port wing 20,120.

The position of the ullage storage facility, the inerting system (OBIGGS), the pressure controllable valve assembly 57, 157 or the climb-dive valve 55, 155, as well as the wing geometry shown is only indicative.

For example, the ullage 54, 154 could be stored outside of the centre wing tank area 30, 130, for example, in a belly fairing area of an aircraft, or just forward or aft of the centre tanks (for example, in cargo space) or in the tail cone of the aircraft. Storing ullage in the tail cone would work especially well with tailplane fuel tanks.

The ullage 54, 154 may be urged (not just allowed) to flow through the pressure valve assembly 57, 157 by a pump or compressor.

Also, the ullage 54, 154 stored in the bladder 62, 162 could be dried (for example, by cycling the ullage through a drier to remove water) in preparation for returning it to the fuel tank 51, 151.

Upon descent, or just before descent (FIG. 2*d*), air from the atmosphere (generally dry air at high altitude, compared to low altitude) could be taken in to the tank 51, 151 or the bladder 62, 162 to help achieve the required pressure in the tank 51, 151. This drier air minimises the problems of water ingestion. However, importantly, the amount ingested would be less than would have been needed if the bladder 62, 162 was not present. Hence, the problems of water ingestion are less than in the prior art.

Also, the OBIGGS could be operated after landing for a short amount of time (e.g. a few minutes) to allow the pressure in the tank 51, 151 to be restored with ODA.

The OBIGGS could be operated to produce ODA and store it in the bladder 62, 162, in advance. (This is opposed to producing the ODA at the point when or shortly before it is needed.) This allows the OBIGGS to be operated more effectively and hence, the OBIGGS may be able to be smaller in size and weight. The OBIGGS could be used to treat the ullage in the bladder 62, 162 and return it (with less oxygen present) to the bladder 62, 162.

Also, the ullage 54, 154 may be stored, instead of or as well as in an expandable bladder 62, 162, in a compressed air tank (using a pump or compressor to pressurise the gas). This would allow more ullage to be stored and would be more space efficient (although it would incur a weight penalty). There may also be an accumulator bladder for controlling ullage transfer between the compressed air tank and the fuel tank 51, 151. The ullage may also be stored in a number of different containers, rather than one single container.

Where in the foregoing description, integers or elements are mentioned which have known, obvious or foreseeable equivalents, then such equivalents are herein incorporated as if individually set forth. Reference should be made to the claims for determining the true scope of the present invention, which should be construed so as to encompass any such equivalents. It will also be appreciated by the reader that integers or features of the invention that are described as preferable, advantageous, convenient or the like are optional and do not limit the scope of the independent claims. Moreover, it is to be understood that such optional integers or features, whilst of possible benefit in some embodiments of the invention, may not be desirable, and may therefore be absent, in other embodiments.

The invention claimed is:

1. A method of operating an aircraft, comprising:
supplying fuel to a fuel storage facility of an aircraft fuel system of the aircraft,
transferring at least some ullage from the fuel storage facility, through a transfer arrangement, to a separate ullage storage facility, based on a pressure input to the transfer arrangement,
storing at least some of the transferred ullage in the ullage storage facility, and
transferring at least some of the stored ullage from the ullage storage facility, through the transfer arrangement, to the fuel storage facility, based on the pressure input to the transfer arrangement,
descending the aircraft to a reduced altitude level, thereby decreasing the pressure in the fuel storage facility relative to atmospheric pressure, and, at the reduced altitude level, transferring at least some ullage from the ullage storage facility, through the transfer arrangement, to the fuel storage facility, based on a pressure input to the transfer arrangement, and in-taking atmospheric air from outside the aircraft into the fuel storage facility at a first altitude and then allowing transfer of the at least some of the stored ullage from the ullage storage facility, through the transfer arrangement, to the fuel storage facility at a second, lower altitude.

2. A method of operating an aircraft as claimed in claim 1, wherein the transfer of ullage between the fuel storage facility and the ullage storage facility is controlled by a pressure-controlled valve arrangement, based on a pressure input to the pressure-controlled valve arrangement.

3. A method of operating an aircraft as claimed in claim 1, wherein the pressure input is an indication of the pressure in the fuel storage facility.

4. A method of operating an aircraft as claimed in claim 1, wherein the method comprises the step of flying the aircraft, thereby using up some of the fuel in the fuel storage facility and thereby reducing the pressure in the fuel storage facility, and then transferring at least some of the stored ullage from the ullage storage facility, through the transfer arrangement, to the fuel storage facility, based on the pressure input to the transfer arrangement.

5. A method of operating an aircraft as claimed in claim 1, wherein the method comprises the step of climbing the aircraft to an increased altitude level, thereby increasing the pressure in the fuel storage facility relative to atmospheric pressure, and, at the increased altitude level, transferring at least some ullage from the fuel storage facility, through the transfer arrangement, to the ullage storage facility, based on a pressure input to the transfer arrangement.

* * * * *